US010931070B1

(12) United States Patent
Files et al.

(10) Patent No.: US 10,931,070 B1
(45) Date of Patent: Feb. 23, 2021

(54) INFORMATION HANDLING SYSTEM HINGE WITH INTEGRATED COAXIAL CABLE CONNECTION

(71) Applicant: Dell Products L.P., Round Rock, TX (US)

(72) Inventors: Jace W. Files, Round Rock, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/740,643

(22) Filed: Jan. 13, 2020

(51) Int. Cl.
| E05D 11/00 | (2006.01) |
| G06F 1/16 | (2006.01) |
| H01R 24/40 | (2011.01) |
| H01R 9/05 | (2006.01) |
| H01R 13/622 | (2006.01) |
| H01R 103/00 | (2006.01) |

(52) U.S. Cl.
CPC ......... *H01R 24/40* (2013.01); *E05D 11/0081* (2013.01); *G06F 1/1681* (2013.01); *H01R 9/0518* (2013.01); *H01R 9/0521* (2013.01); *H01R 9/0524* (2013.01); *H01R 13/622* (2013.01); *H01R 2103/00* (2013.01)

(58) Field of Classification Search
CPC .... G06F 1/1681; G06F 1/1683; G06F 1/1616; E05Y 2900/606; E05D 11/0081; H04M 1/0218; H04M 1/022
See application file for complete search history.

(56) References Cited

U.S. PATENT DOCUMENTS

| 5,727,960 | A | 3/1998 | Zehrung | |
| 7,310,472 | B2 | 12/2007 | Haberman | |
| 8,982,542 | B2 | 3/2015 | Bohn | |
| 9,507,386 | B2 * | 11/2016 | Rosen | E05D 3/02 |
| 9,535,465 | B2 | 1/2017 | Bohn et al. | |
| 2017/0147035 | A1 * | 5/2017 | Han | G06F 1/1616 |
| 2018/0348825 | A1 * | 12/2018 | Rittenhouse | G06F 1/1681 |
| 2019/0050028 | A1 * | 2/2019 | Chung | F16C 11/04 |
| 2019/0317572 | A1 * | 10/2019 | North | G06F 1/1616 |

FOREIGN PATENT DOCUMENTS

EP 1858123 B1 12/2011

* cited by examiner

*Primary Examiner* — Vanessa Girardi

(74) *Attorney, Agent, or Firm* — Zagorin Cave LLP; Robert W. Holland

(57) ABSTRACT

An information handling system dual axis hinge integrates a coaxial conductor and coaxial dielectric in a U-shaped sheath that provides first and second axles about which first and second bracket gears rotate. The coaxial conductor supports shielded and grounded signal communications between opposing portions of an information handling system housing. First and second torque brackets insert over the sheath and couple to the opposing housing portions to generate friction during housing rotation by interaction of the torque bracket rotating around the sheath.

19 Claims, 7 Drawing Sheets

INFORMATION HANDLING SYSTEM HINGE WITH INTEGRATED COAXIAL CABLE CONNECTION

BACKGROUND OF THE INVENTION

Field of the Invention

The present invention relates in general to the field of portable information handling system communications, and more particularly to an information handling system hinge with integrated coaxial cable connection.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Convertible portable information handling system configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate to close the lid housing portion over the main housing portion to protect the keyboard and display, thus reducing the system footprint for improved storage and mobility.

To increase display area, information handling systems have recently begun to replace the integrated keyboard with a second display. In such systems, a clamshell configuration presents a virtual keyboard at a horizontally-disposed display to accept end user inputs. When the housing portions rotate 180 degrees from the closed position to a tablet position, both housing portions can present information as visual images for an improved end user experience. With a very thin housing and narrow hinge, the distance between displays integrated in opposing housing portions is minimized so that the combined area of both displays can effectively present a single image with just a small break between two image halves. In some instances, a foldable organic light emitting diode (OLED) display is disposed over both housing halves to fold about the hinge so that a visual image may be presented across the entire display without a break.

One difficulty with the use of dual screens across both housing portions of a portable information handling system is that both housing portions generally have the same height or thickness so that the system rests flat on a support surface when presenting visual images in the tablet configuration. To minimize housing thickness, processing components are disposed throughout the housing halves with communication provided between the housing halves by a flexible circuit board or other communication medium that interfaces the components. One difficulty with the use of such flexible circuits is that the thin material and small available thickness limit the availability of shielding to maintain signal integrity. In some instances, a lack of shielding can prove destructive to weak signals and can result in crosstalk from strong signals that disrupt other weaker communication links. For example, antenna signaling is typically transferred through a coaxial cable with a grounded shield to protect signal integrity, such as between a radio and an antenna. Coaxial cables by definition use a significant amount of thickness, sometimes referred to as Z-height, to keep optimized geometric structures for low-loss signal transmission. Routing a coaxial cable through a narrow hinge path becomes increasingly difficult as hinge sizes and housing thicknesses decrease.

SUMMARY OF THE INVENTION

Therefore, a need has arisen for a system and method which integrates a coaxial cable connection through an information handling system hinge.

In accordance with the present invention, a system and method are provided which substantially reduce the disadvantages and problems associated with previous methods and systems for routing a coaxial cable between information handling system housing portions. A coaxial conductor and dielectric pass through a U-shaped sheath that defines rotation axes of a dual axle hinge to support shielded and grounded signal communications between opposing housing portions of an information handling system.

More specifically, an information handling system processes information with processing components disposed in a portable housing, such as central processing unit (CPU) and memory. The portable housing is rotationally coupled by dual axle hinges disposed on opposing sides to support rotation through 360 degrees. In a dual display configuration, each housing has an integrated display so that, for instance, in a tablet mode both displays present a visual image to provide an increased viewing area. To minimize space between the displays, a small Z-height and minimal hinge size are used. The hinge has first and second axles formed by a U-shaped sheath terminating in first and second lengths and integrating a coaxial conductor and dielectric. A gear box has first and second gear brackets that insert over the first and second lengths and interact through idler gears to transfer rotation between the axles. The coaxial conductor provides a shielded and ground signal interface for communication of signals between housing portions, such as between a radio integrated in one housing portion and an antenna integrated in the other housing portion.

The present invention provides a number of important technical advantages. One example of an important technical advantage is that signals are transferred through a coaxial cable integrated in a hinge sheath that provides dual axles for supporting synchronized housing portion rotation. The hinge sheath provides sufficient room for optimized geometric structures and ground to promote low loss signal transmission with a minimal Z height of 6 mm for the housing. For instance, the torque sheath provides a coaxial transmission path with a diameter of only approximately 1.3 mm that supports 360 degrees of rotation about dual parallel axles. Coaxial connectors at the termination of the sheath lengths area exposed at the hinge articulation location for a robust interface with minimal signal loss.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A dual display portable information handling system communicates signals between housing portions through a coaxial conductor integrated in a dual axle sheath having coaxial dielectric insulation around the coaxial conductor and a grounded exterior surface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
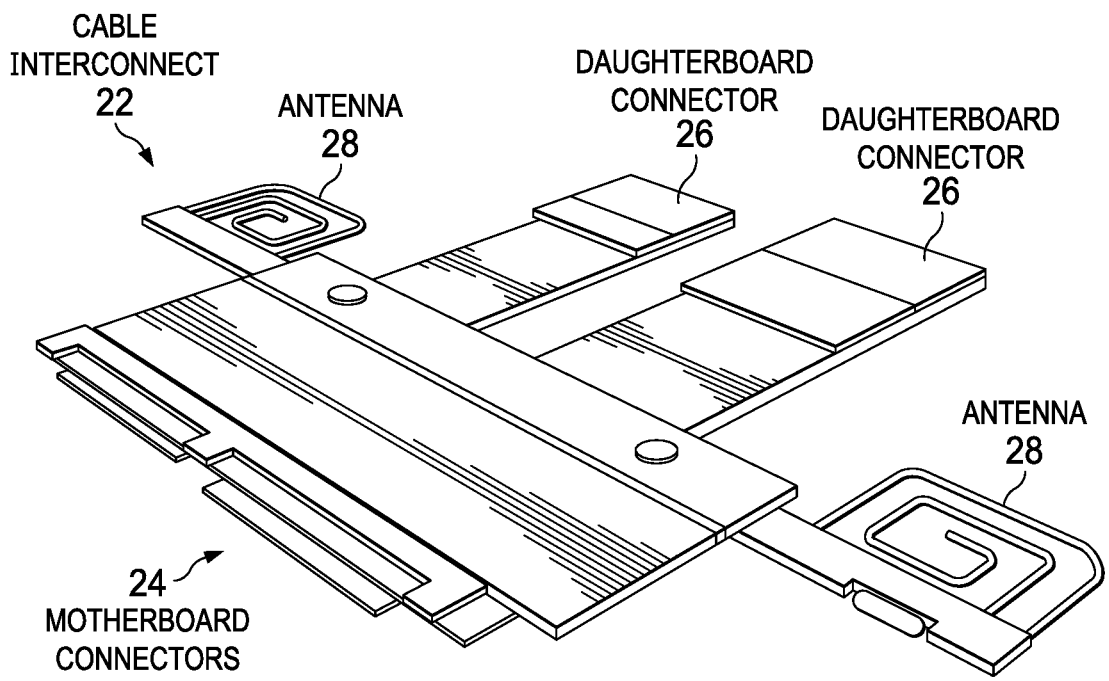
FIG. 1C depicts a side perspective view of a dual display portable information handling system opened to a tablet configuration, with FIG. 1A depicting a cable interconnect to communicate between housing portions and FIG. 1B depicting a hinge integrated coaxial cable interface.
Figure 1B:
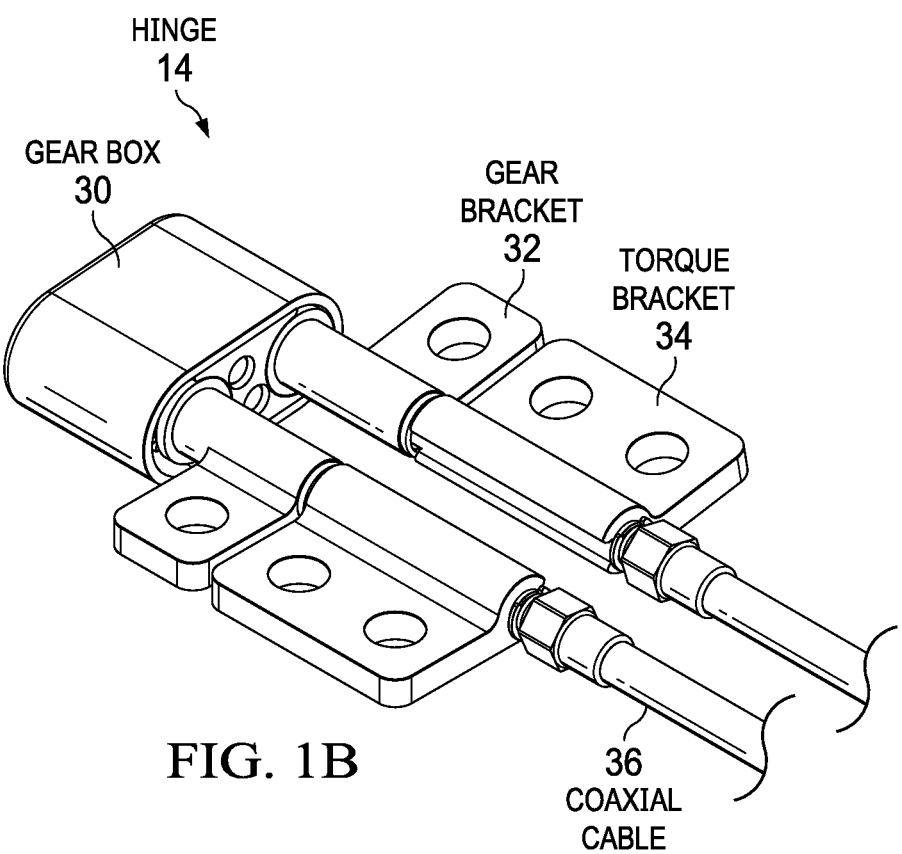
Figure 1C:
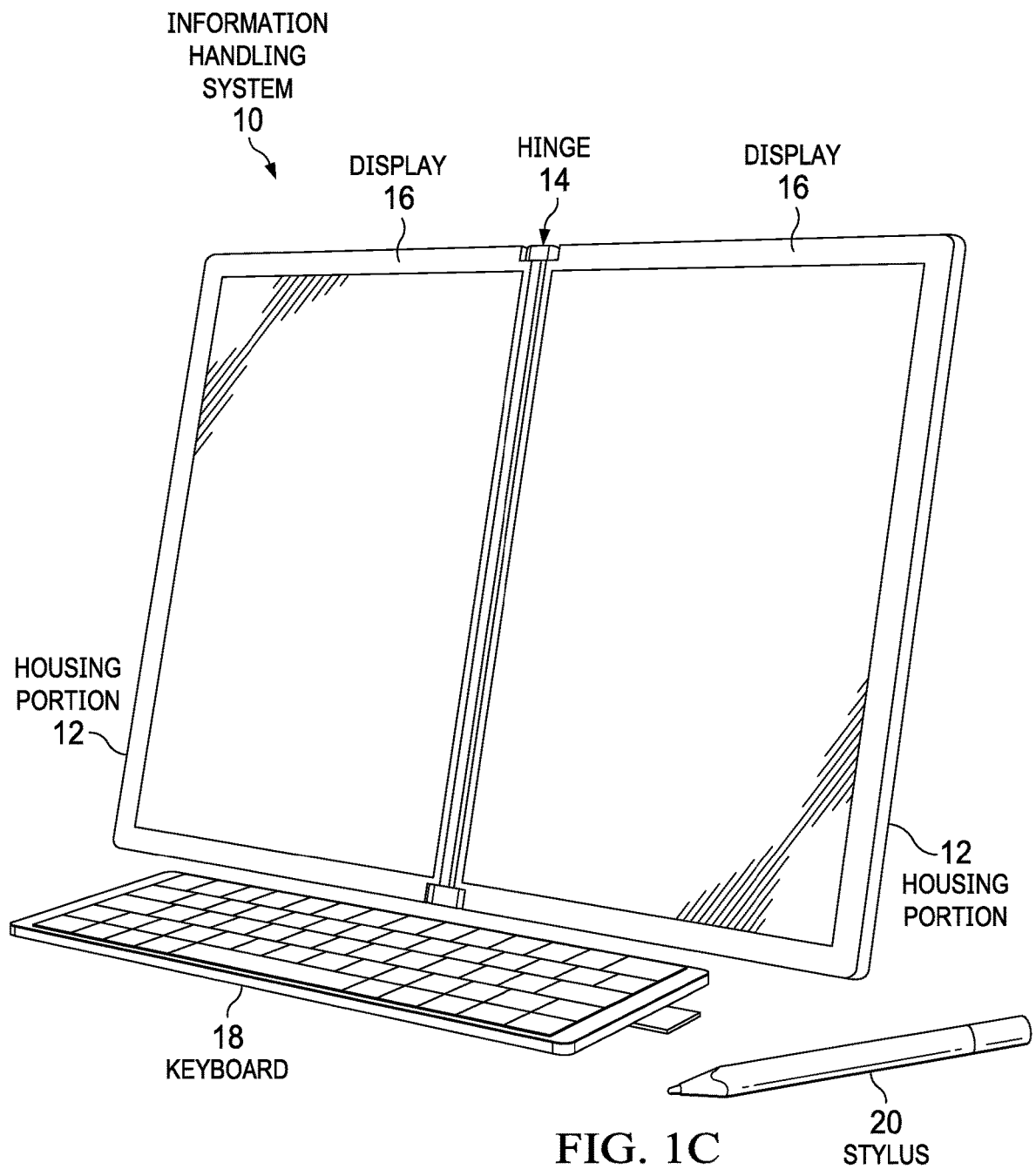

Referring now to FIGS. 1A, 1B and 1C, FIG. 1C depicts a side perspective view of a dual display 16 portable information handling system 10 opened to a tablet configuration. Information handling system 10 has first and second equal-sized housing portions 12 rotationally coupled at opposing sides by first and second hinges 14. A thin housing construction, known as low Z height, and small hinge 14 minimizes the distance between displays 16 when information handling system 10 rotates to the tablet configuration having housing portions 12 in a common plane, as depicted in FIG. 1C. A keyboard 18 interfaces with a wireless connection, such as Bluetooth, to accept end user key inputs. In addition, each display 16 integrates a touch detection surface to accept touch inputs. A stylus 20 aids in touch inputs to the touch detection surface through a precise touch point. In the example embodiment, hinges 14 support 360 degrees of rotation of housing portions 12 about dual axes, as described in greater detail below. In alternative embodiments, alternative arrangements for rotating housing portions 12 and presenting visual information may be used, such as by using an OLED flexible display, using different sized housings, and restricting rotation to 180 degrees.

Referring now to FIG. 1A, a flexible cable interconnect 22 depicts an example of a communication interface to support communication between processing components disposed in housing portions 12. In the example embodiment, motherboard connectors 24 couple to a motherboard in one housing portion 12 and daughterboard connectors 26 couple to daughterboards in another housing portion 12. Antenna 28 extend from the daughterboard side of cable interconnect 22 to support wireless communication signals by a radio. Cable interconnect 22 is built from flexible circuit board material to flex between housing portions 12 during rotation about hinges 14. However, wireless communication signals between antenna 28 in the daughterboard housing portion do not efficiently transfer to the motherboard housing portion through the flexible circuit board material so that excessive signal loss and crosstalk with other communication links would occur. In order to effectively communicate radio signals, hinges 14 each integrate a coaxial conductor and dielectric within a sheath so that coaxial cables 36 transfer signals efficiently across housing portions 12. FIG. 1B depicts an example of a hinge 14 that couples with coaxial cables 36 to transfer radio signals between a radio and antenna 28. Hinge 14 has a U-shaped stainless steel sheath that defines parallel axles about which opposing gear brackets 32 and torque brackets 34 rotate. As described in greater detail below, gear box 30 houses interconnected gears that transfer rotation between the dual parallel axles for synchronized housing portion 12 rotation.

Figure 2A:
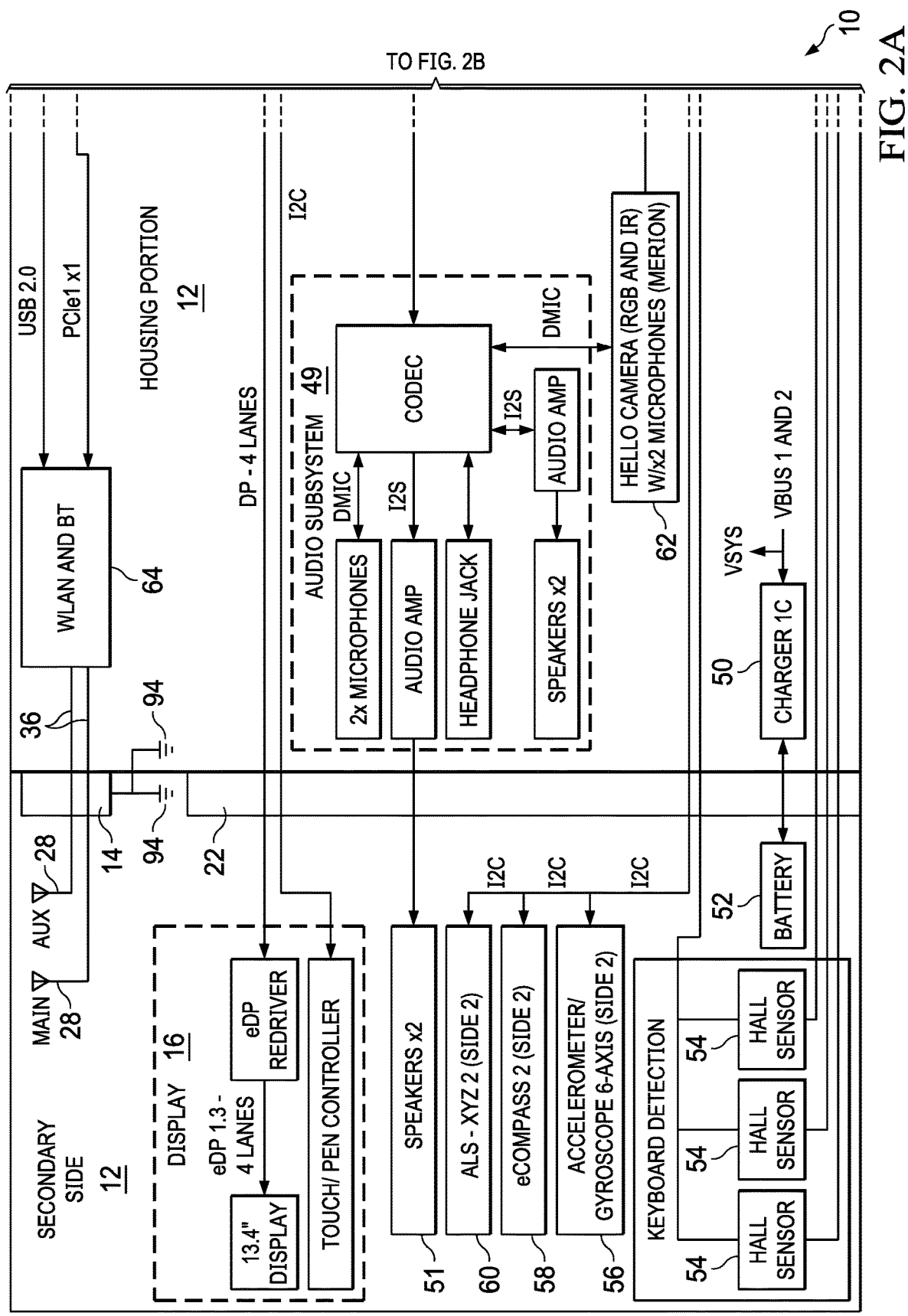
FIGS. 2A and 2B depict a circuit block diagram of the portable information handling system processing components to process information for presentation as visual images at the integrated dual displays.
Figure 2B:
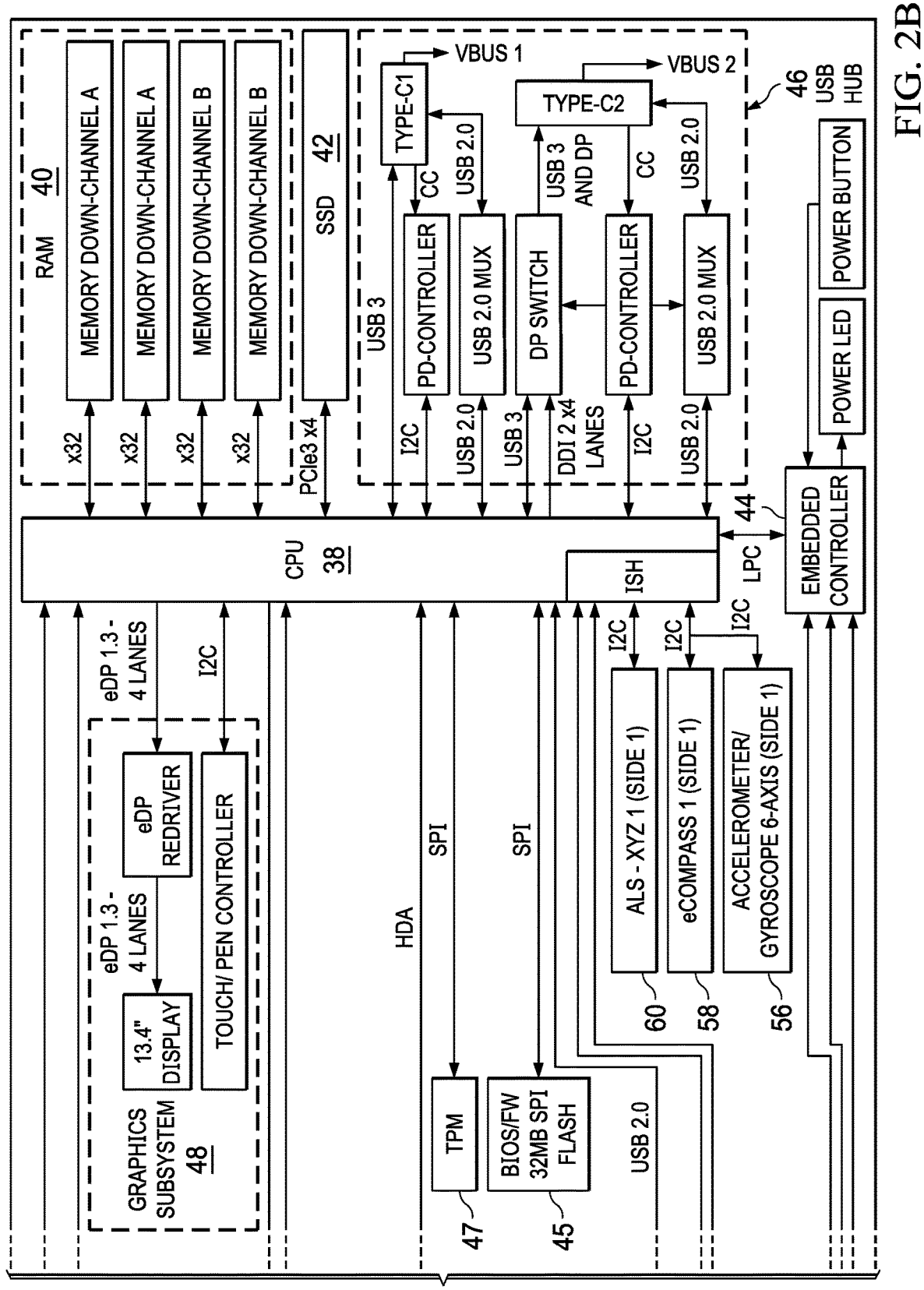

Referring now to FIGS. 2A and 2B, a circuit block diagram depicts portable information handling system 10 processing components to process information for presentation as visual images at the integrated dual displays 16. A motherboard side of cable interconnect 22 includes a central processing unit (CPU) 38 that executes instructions to process information and a random access memory (RAM) 40 that stores the instructions and information. For instance, a solid state drive (SSD) 42 stores an operating system and applications in persistent non-transitory memory that are retrieved at power up to RAM 40, such as with pre-boot instructions that execute on an embedded controller 44. A BIOS 45 and trusted platform module (TPM) 47 include embedded code in non-transitory memory, to manage communications between processing components in a secure manner under the direction of the operating system. A USB hub 46 provides peripheral communication and power from an external power source, such as to a charger 50 that charges battery 52 and provides power to the processing components through various power supply subsystems. A graphics subsystem 48 processes information from CPU 38 to generate pixel values for presentation at the dual displays 16. An audio system 49 processes information from CPU 38 to generate sounds at speakers 51. In the example embodiment, visual and audio information is communicated through cable interconnect 22 for presentation at displays 16 and speakers 51. A variety of sensors are included in both housing portions 12 to communicate across cable interconnect 22 as necessary, such as accelerometers 56, compass 58, ambient light sensors 60 and Hall sensors 54.

In the example embodiment, a radio 64 interfaces with CPU 38 to support wireless communication through a wireless local area network (WLAN) and wireless personal area network (WPAN) like Bluetooth. A main and auxiliary antenna 28 are disposed in the opposite housing portion to send and receive the wireless signals. To communicate the signals between the radio 64 and antenna 28, a coaxial cable that shares ground 94 with both housing portions 12 is integrated through hinge 14. Transporting signals through the hinge provides sufficient room so that a shielded signal is communicated with minimal loss and without impacting hinge operation.

Figure 3:
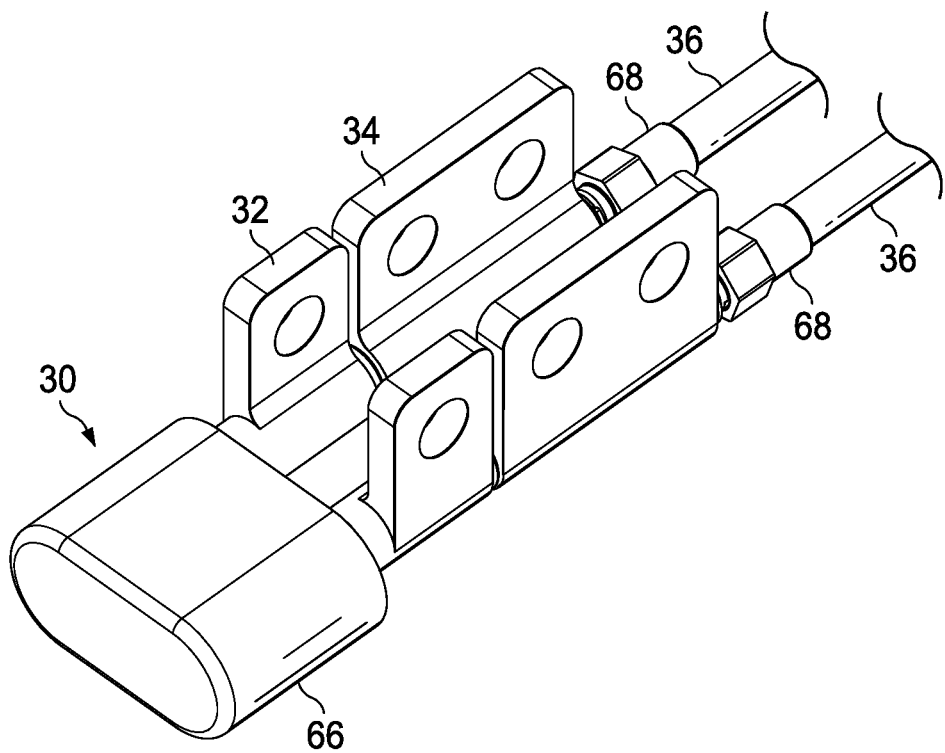
FIG. 3 depicts a rear perspective view of the hinge in a closed position and having an integrated coaxial cable.

Referring now to FIG. 3, a rear perspective view depicts the hinge 14 in a closed position and having an integrated coaxial cable. In the example embodiment, a gear cover 66 protects the gear box 30 having gears to transfer rotational motion about the dual axles. Gear brackets 32 integrate both a bracket that couples to a housing portion and a gear that transfers rotational movement within gear box 30. Torque brackets 34 are separate from gear brackets 32 and each coupled to the housing portion. As the housing portions rotate, the rotation imparts to torque brackets 34, which compress against the underlying axles so that friction produces torque that works against the rotation. Coaxial cables 36 that interface with a radio and antenna each have a female coaxial connector 68 to attach to threads formed in each of the axles and interface signals through a coaxial conductor integrated in the dual axles. Although the example embodiment interfaces a radio and antenna through the integrated coaxial conductor, in alternative embodiments other types of signals may be communicated.

Figure 4:
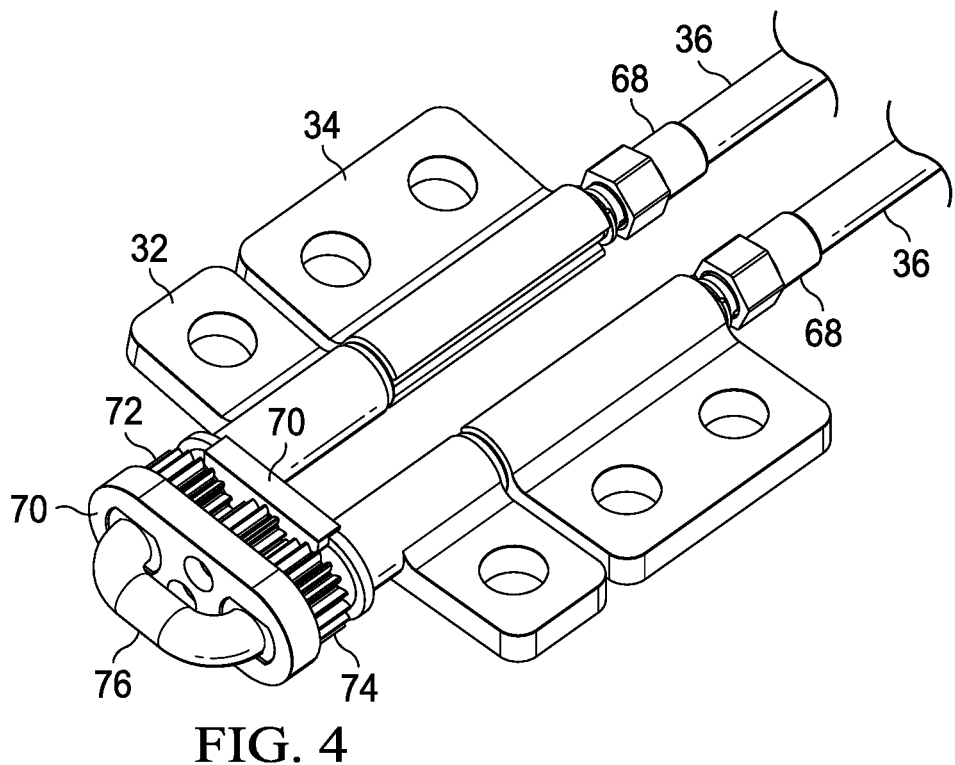
FIG. 4 depicts a rear perspective view of the hinge with a gear cover removed to expose the main and idler gear interactions for synchronized housing portion rotation.

Referring now to FIG. 4, a rear perspective view depicts the hinge 14 with gear cover 66 removed to expose the main gear 74 and idler gear 72 interactions for synchronized housing portion 12 rotation. A torque sheath 76 having a U-shape provides both the axles about which gear brackets 32 rotate and through which a coaxial conductor and dielectric are integrated. Main gears 74 and idler gears 72 are held in relation to each other with a gear brace 70 so that motion of each gear bracket 32 is translated to the other gear bracket 72 through interactions with idler gears 72 for synchronized motion of housing portions 12.

Figure 5:
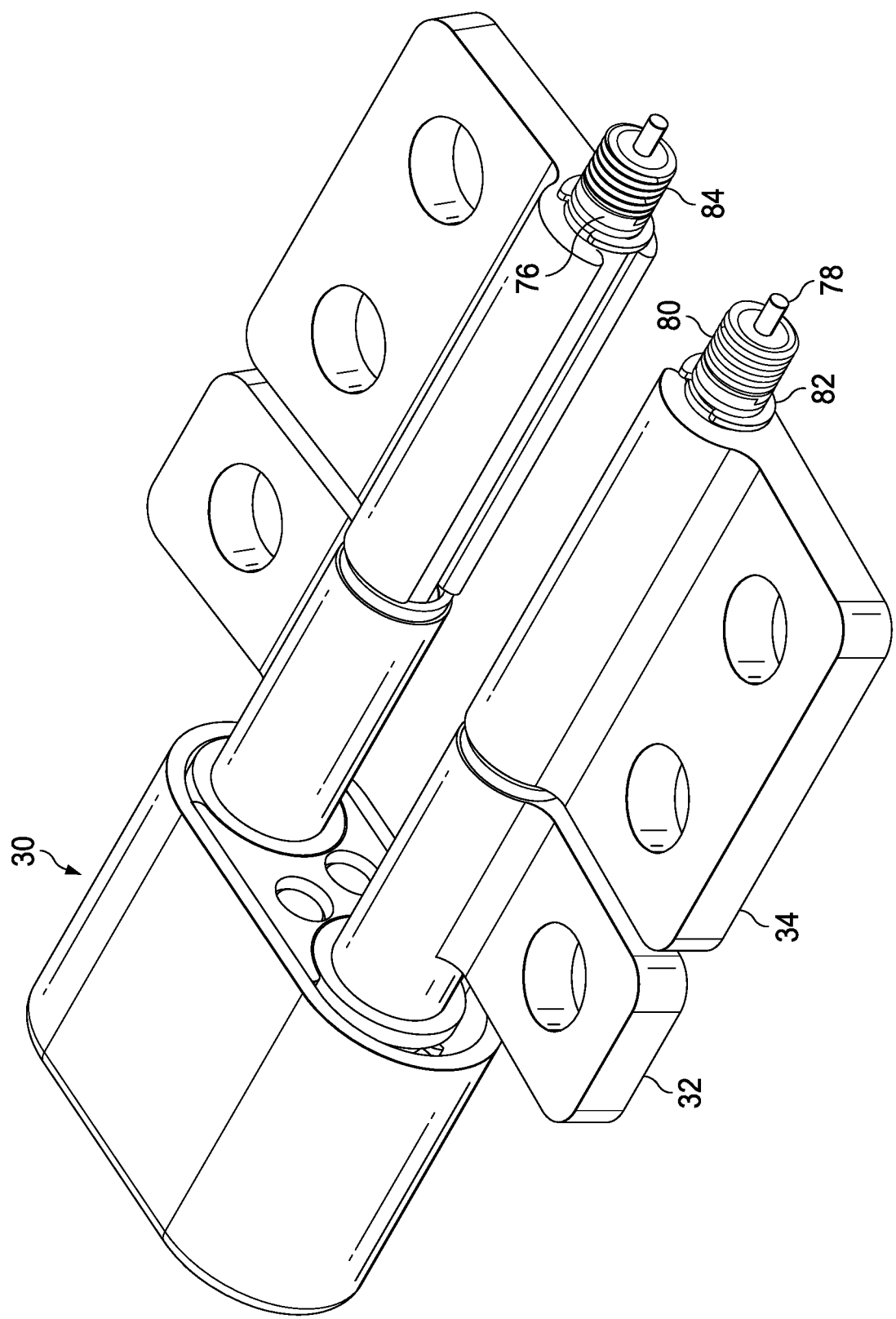
FIG. 5 depicts a front perspective view of the hinge having male coaxial cable threads formed at termination of a torque sheath to couple to coaxial cables in opposing housing portions.

Referring now to FIG. 5, a front perspective view depicts hinge 14 having male coaxial cable threads 84 formed at termination of a torque sheath 76 right and left lengths to couple to coaxial cables 36 in opposing housing portions 12. In the example embodiment, torque sheath 76 is a contiguous tube of stainless steel so that the first and second lengths extending from the U-shape terminate with the threaded portions. Gear bracket 32 and torque bracket 34 insert over each length of torque sheath 76 with a retainer 82 placed between torque bracket 34 and threads 84 to hold torque bracket 34 in place. A coaxial conductor 78 proceeds through the center of torque sheath 76 between termination at the end of the lengths so that a continuous conductor runs through the stainless steel tube. A dielectric 80 isolates the conductor 78 to from the stainless steel material, which is grounded to each housing portion to provide good signal transmission along conductor 78.

Figure 6:
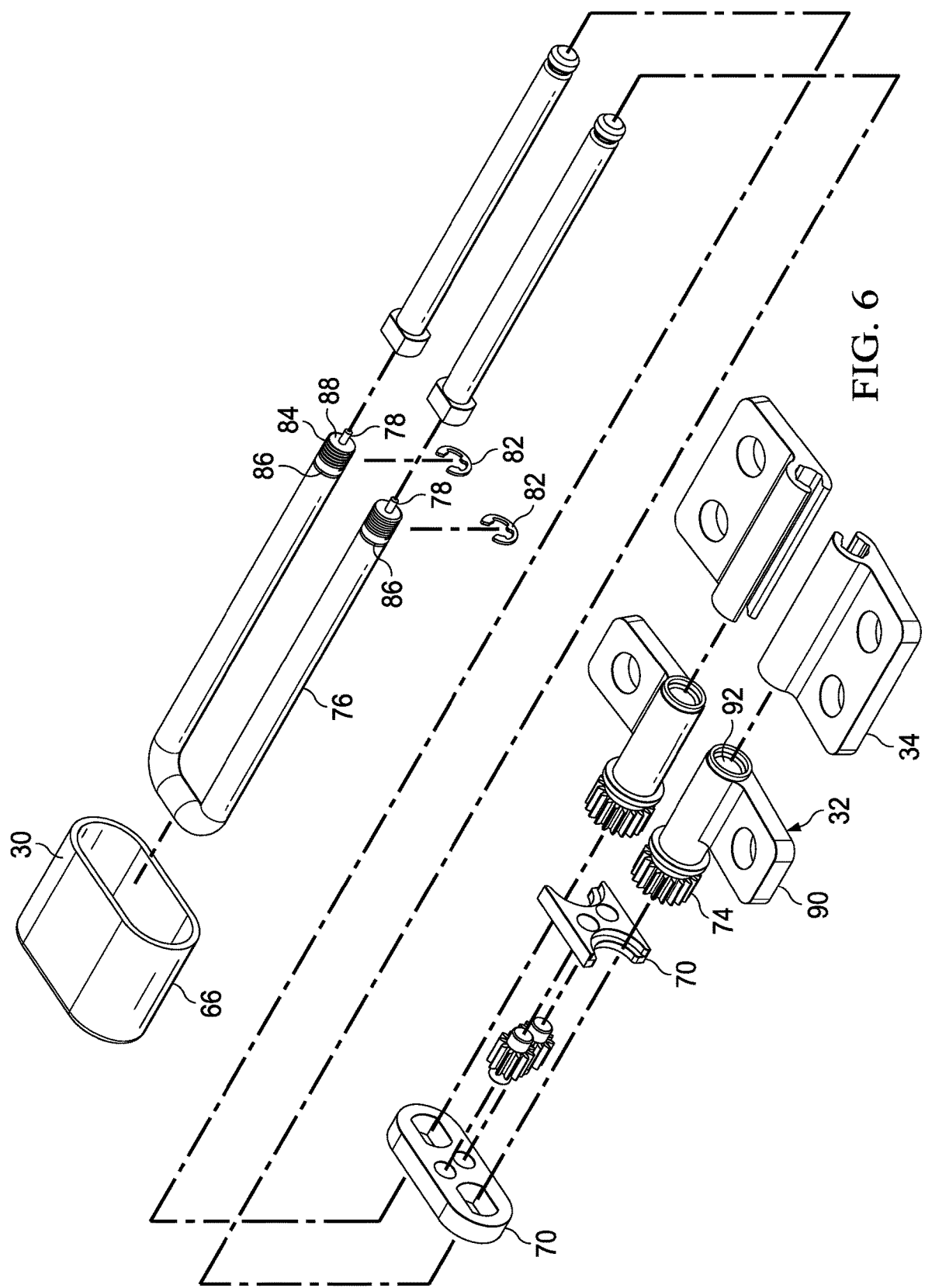
FIG. 6 depicts an exploded view of the hinge having gear brackets aligned to couple to opposing lengths of the torque sheath.

Referring now to FIG. 6, an exploded view depicts hinge 14 having gear brackets 32 aligned to couple to opposing lengths of the torque sheath 76. Torque sheath 76 extends parallel lengths out from the U-shaped base with each length defining an axis about which the housing portions rotate. Each gear bracket 32 has a gear portion 74 integrated with a bracket portion 90 to transfer rotational movement from each housing portion to the other through gear interactions. Gear portion 74 has an opening 92 that inserts over a length of torque sheath 76 towards the U-shaped portion. A retainer groove 86 is formed near threads 84 to accept a retainer, such as a C-clip, that holds torque bracket 34 on the length of torque sheath 76. To manufacture hinge 14, torque sheath 76 is bent to the U-shape and has the coaxial conductor 78 and dielectric integrated in its interior. Torque sheath 76 then inserts each length in a gear 74 opening 92. Gear cover 66 holds the gear box 30 in place and torque brackets 34 are inserted over torque sheath 76 lengths from threads 84 and locked in place by retainer 82. Once gear bracket 32 and torque bracket 34 couple to opposing housing portions 12, such as with screws, synchronized motion of the housing portions is supported with friction generated torque to regulate housing portion position changes.

Although the present invention has been described in detail, it should be understood that various changes, substitutions and alterations can be made hereto without departing from the spirit and scope of the invention as defined by the appended claims.

What is claimed is:

1. A hinge comprising:
   a sheath having a U-shape terminating at first and second parallel lengths;
   a first gear bracket inserted on the first parallel length to rotate about a first axis defined by the first parallel length;
   a second gear bracket inserted on the second parallel length to rotate about a second axis defined by the second parallel length; and
   a coaxial conductor and a coaxial dielectric disposed in the sheath, the conductor extending from the first and second lengths to communicate signals through the sheath.

2. The hinge of claim 1 wherein the first and second lengths terminate with a male thread configured to couple with a female coaxial connector.

3. The hinge of claim 2 further comprising:
   a first torque bracket inserted over the first length to generate friction that resists rotation of the first torque bracket about the first length; and
   a second torque bracket inserted over the second length to generate friction that resists rotation of the second torque bracket about the second length.

4. The hinge of claim 3 further comprising a gear box containing a gear portion of the first gear bracket and the second gear bracket to translate rotational movement between the first and second gear brackets.

5. An information handling system comprising:
   a housing having first and second housing portions;

processing components disposed in the housing and operable to process information;

a hinge rotationally coupling the first and second housing portions, the hinge having a gear box, the gear box having a first axis gear with a first opening and a second axis gear with a second opening, the hinge further having a torque sheath bent to insert through the first and second openings with a first length disposed along the first axis and a second length disposed along the second axis, a first bracket inserted over the first length and coupled to the first axis gear and the first housing portion, and a second bracket inserted over the second length and coupled to the second axis gear and the second housing portion; and a coaxial conductor integrated in a coaxial dielectric and disposed within the torque sheath to communicate signals between the first and second housing portions.

6. The information handling system of claim 5 further comprising:

a radio disposed in the first housing portion and interfaced with the coaxial conductor at the first length; and an antenna disposed in the second housing and interfaced with the coaxial conductor at the second length, the coaxial conductor communicating signals between the radio and antenna.

7. The information handling system of claim 6 further comprising a ground of the torque sheath shared with the radio.

8. The information handling system of claim 7 further comprising:

a first liquid crystal display disposed over the first housing portion to present the information as visual images; and a second liquid crystal display disposed over the second housing portion to present the information as visual images.

9. The information handling system of claim 6 further comprising:

a first threaded portion terminating the first length and coupled to a female coaxial cable connector of the radio; and a second threaded portion terminating the second length and coupled to a female coaxial cable connector of the antenna.

10. The information handling system of claim 9 further comprising:

a first torque bracket inserted over the first length and coupled to the first housing portion, the first torque bracket compressing the first length to resist rotation about the first length; and a second torque bracket inserted over the second length and coupled to the second housing portion, the second torque bracket compressing the second length to resist rotation about the second length.

11. The information handling system of claim 10 further comprising:

a first retainer coupled to a first retainer groove formed at the first length, the first retainer restraining the torque bracket on the first length; and a second retainer coupled to a second retainer groove formed at the second length, the second retainer restraining the torque bracket on the second length.

12. The information handling system of claim 10 further comprising a cover coupled over the gear assembly and the torque sheath bent portion.

13. A method for assembly of an information handling system, the method comprising:

bending a torque sheath to have a U-shape terminating at first and second lengths;

integrating a coaxial conductor and coaxial dielectric in an interior of the torque sheath;

inserting the first and second lengths through first and second gears of a gear assembly, the first gear having a first bracket, the second gear having a second bracket;

coupling the first bracket to a first housing portion;

coupling the second bracket to a second housing portion; and interfacing a component disposed in the first housing portion with a component disposed in the second housing portion through the coaxial conductor.

14. The method of claim 13 wherein the component disposed in the first housing portion comprises a radio and the component disposed in the second housing portion comprises an antenna.

15. The method of claim 14 further comprising:

integrating a first liquid crystal display in the first housing portion; and integrating a second liquid crystal display in the second housing portion.

16. The method of claim 13 further comprising:

rotating the first housing portion about a first axis defined by the first length; and translating the rotating from the first gear to the second gear to rotate the second housing portion about a second axis defined by the second length.

17. The method of claim 16 further comprising:

inserting a first torque bracket over the first length;

coupling the first torque bracket to the first housing portion;

inserting a second torque bracket over the second length;

coupling the second torque bracket to the second housing portion;

in response to the rotating, generating torque by rotating the first torque bracket relative to the first length and rotating the second torque bracket relative to the second length.

18. The method of claim 17 further comprising:

forming a groove in each of the first and second lengths; and inserting a retainer in each groove to retain the first and second torque brackets between the first and second brackets and the ends of the first and second lengths.

19. The method of claim 18 further comprising:

forming a thread at the end of each of the first and second lengths; and coupling a female coaxial connector to each thread.

* * * * *